No. 867,744.  
PATENTED OCT. 8, 1907.  
J. B. McCABE.  
MAGNETIC SEPARATOR.  
APPLICATION FILED NOV. 13, 1906.

2 SHEETS—SHEET 2.

WITNESSES

INVENTOR  
James B. McCabe  
BY Munn & Co  
ATTORNEYS

UNITED STATES PATENT OFFICE.

JAMES BERNARD McCABE, OF BUFFALO, NEW YORK.

MAGNETIC SEPARATOR.

No. 867,744.              Specification of Letters Patent.             Patented Oct. 8, 1907.

Application filed November 13, 1906. Serial No. 343,186.

*To all whom it may concern:*

Be it known that I, JAMES BERNARD McCABE, a citizen of the United States, and a resident of Buffalo, in the county of Erie and State of New York, have invented a new and Improved Magnetic Separator, of which the following is a full, clear, and exact description.

This invention is an improvement in magnetic separators of such construction as to effectively remove particles of iron from crushed ore and sand in large quantities, and discharge each after separation, at different points of the machine.

Reference is to be had to the accompanying drawings forming a part of this specification, in which similar characters of reference indicate corresponding parts in all the figures.

Figure 1:
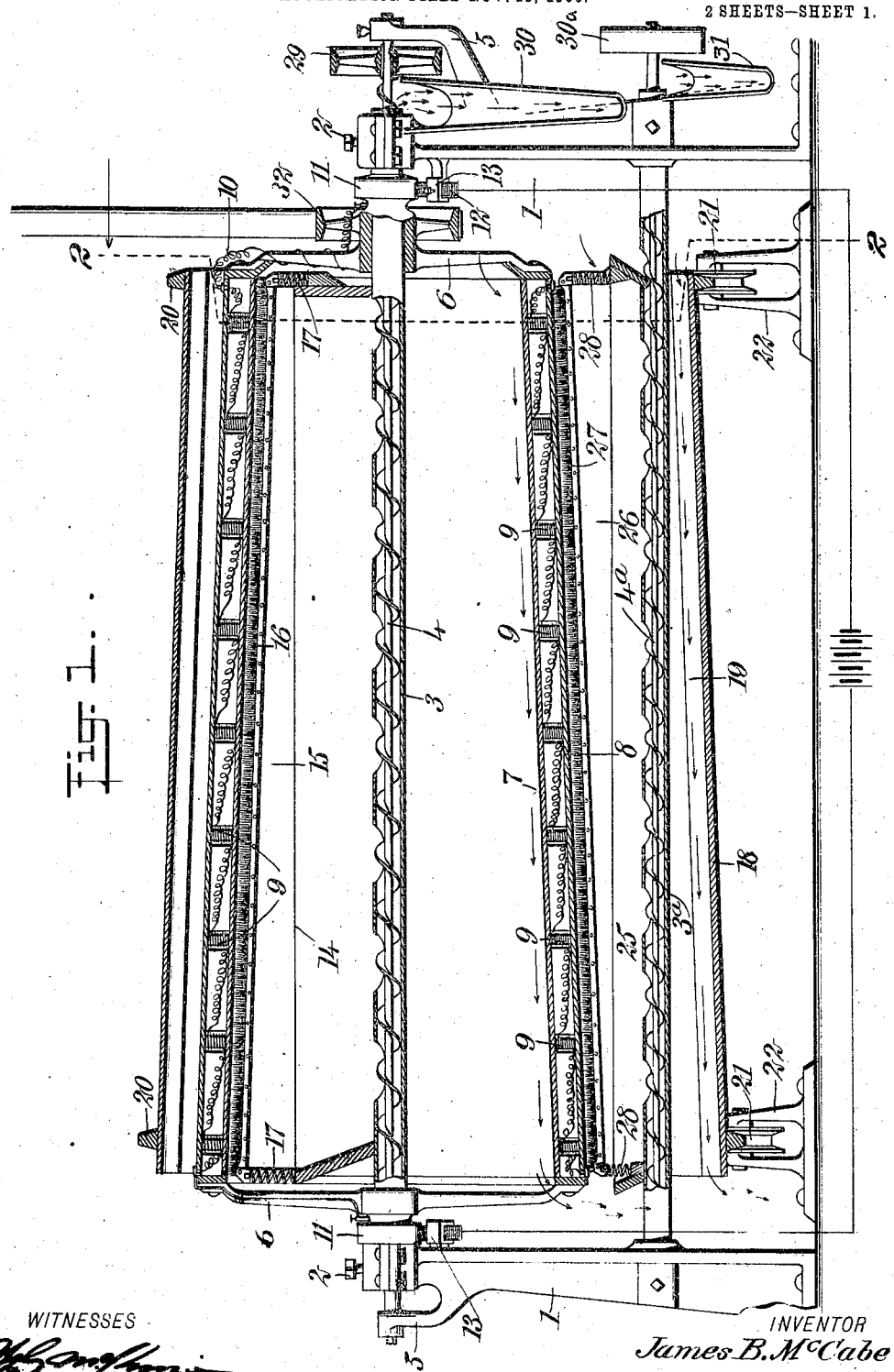
Figure 2:
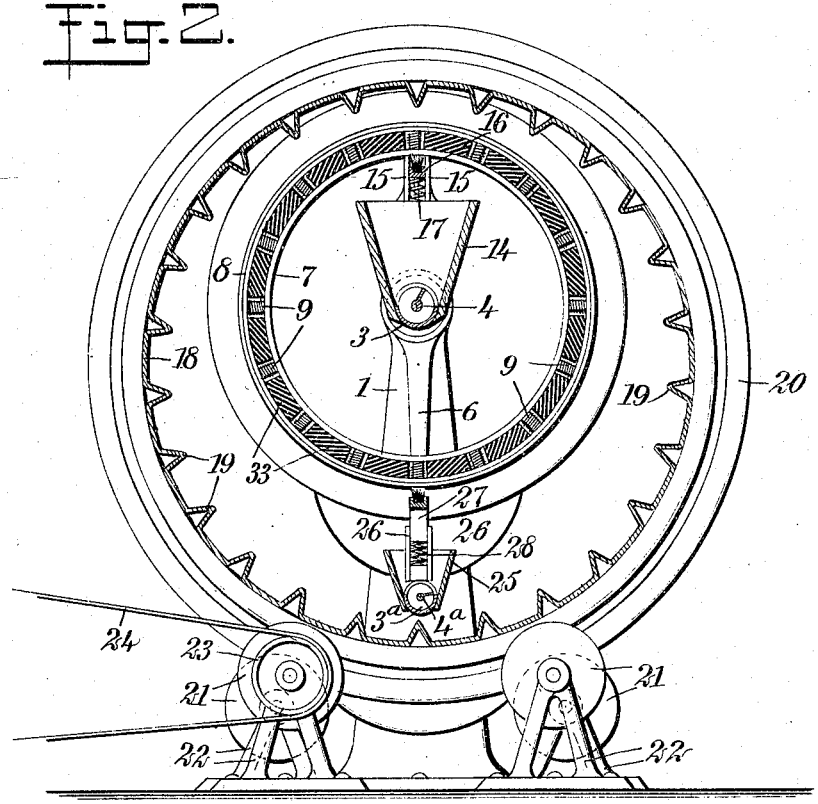
Figure 3:
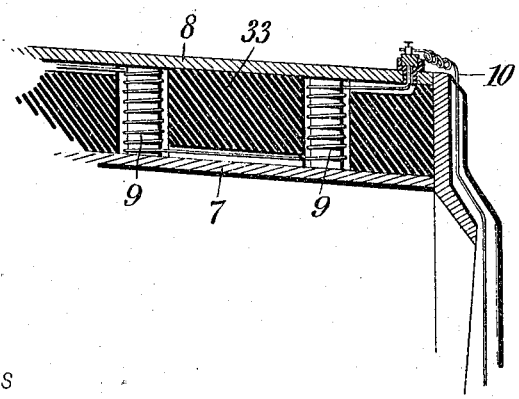

Figure 1 is a central, longitudinal, vertical section through one embodiment of my improved magnetic separator; Fig. 2 is a cross section of the same substantially on the line 2—2 of Fig. 1, looking in the direction of the arrow, and Fig. 3 is a fragmentary, sectional view on an enlarged scale, of a portion of a magnetic drum employed in the construction.

The invention comprises two standards or supports 1, 1 spaced apart a suitable distance and having fixed in their upper ends by set-screws 2, a horizontal shaft 3, said shaft being hollow or in the nature of a pipe for receiving in the interior thereof a spiral conveyer 4, the stem of which is extended at each end beyond the shaft, where it is journaled in arms 5 carried by the supports 1. Journaled on the shaft 3 near each end is a spider or hub 6 forming supports for a conical drum composed of concentric inner and outer shells 7 and 8, respectively, forming between them a compartment in which a series of rows of small iron cores for electro-magnets 9 are placed, the distribution of these cores being such that the magnetic field of both the inner and outer shell of the drum will be substantially uniform, and the thickness of the shells being that which permits of their magnetization to the best advantage. Each core of the electro-magnets 9 is wound with a conductor 10 in a well-known manner, which leads from contact-wheels 11 journaled on the shaft 3 arranged at the opposite ends of the machine. Both wheels are insulated from the shaft 3 and also from the hub 6 to which they are attached. For supplying the wheels 11, a brush 12 bears upon each, and is preferably adjustably supported in a bracket 13 carried by the supports 1. These brushes are connected by conductors to the opposite poles of any source of electrical generation.

As best shown in Fig. 2, the shaft 3 forms the bottom of a V-shaped trough 14 which extends substantially the full length of the drum and supports at each of its ends two parallel plates 15 spaced apart and forming guides for a brush 16, the latter bearing on the inner shell 7 of the drum its entire length directly over the trough. For normally forcing this brush in contact with the shell 7, a spring 17 is positioned under each end, tending to press the brush in an upward direction.

Eccentrically surrounding the drum just described is a second conical drum 18, having a series of longitudinal corrugations 19 therein, forming ribs on the inner face thereof, adapting the drum to perform the function of an elevator as it is revolved. The drum 18 has fixed to it preferably near its ends, circumferential tracks 20, which rest on grooved rollers 21 acting to support the drum in operative position. These rollers are each journaled in a support 22 and are arranged in two sets, one set at each side of a central, vertical plane passing through the drums. One of the rollers 21 is provided in fixed relation to its axis with a pulley 23 which, when driven by a belt 24, revolves the outer drum or elevator about the inner magnetic drum.

Between the outer shell 8 of the inner drum and the bottom of the outer drum, a hollow shaft 3ª is arranged parallel to the shaft 3 and is fixed in the supports 1 by set-screws or other suitable devices. This shaft 3ª is in all respects like the shaft 3 and contains a spiral conveyer 4ª revolubly mounted therein. The shaft 3ª forms the bottom of a V-shaped trough 25 which supports in spaced relation, plates 26, forming guides for a brush 27, the latter extending the entire length of the magnetic drum, and normally forced against the outer shell 8 thereof by springs 28 arranged underneath each end.

In both the shafts 3 and 3ª suitable openings are provided, as best shown in Fig. 1, forming a communication between the supports and their respective conveyers, the latter 4 and 4ª being driven by pulleys 29 and 30ª, respectively, and discharging into chutes 30 and 31 arranged at one end of the machine. The magnetic drum is driven from any suitable source of power by a pulley 32 preferably fixed intermediate the hub 6 and contact-wheel 11 at its small end.

In the operation of the machine, both drums are set in motion and a current sent through the electro-magnets 9, acting to energize them and magnetize the magnetic drum on both its inner and outer shell. Crushed ore or sand containing particles of magnetic metal are then fed into the small end of both drums. The particles of metal in the material fed into the magnetic drum as they come into contact with the shell 7, adhere thereto and are carried to an elevated position where they are removed or detached by the brush 16, said metal particles thereafter dropping into the trough 14 and passing through the hollow shaft 3 by the action of the conveyer 4, to the chute 30. The sand and other non-magnetic matter in this drum is gradually worked by gravity in the direction indicated by the arrows, and discharged at the opposite end of the machine, this gravity discharge being effected by reason of the drum's conical form.

The material fed into the outer drum or elevator 18 is carried by the ribs or corrugations 19 to an elevated position, where it drops by gravity upon the outer shell 8 of the magnetic drum. Such particles of material as are magnetic adhere to the shell, the remainder again falling to the bottom of the drum. This action is continued until the material non-magnetic in character, is discharged in the same manner as that fed into the magnetic drums. The particles of the magnetic material adhering to the shell 8 are detached by the brush 27, from which point they drop into the trough 25, thereafter passing through the shaft 3ª to the chute 31, through the influence of the conveyer 4ª.

As best shown in Figs. 2 and 3, between the inner and outer shells of the magnetic drum and between the several electro-magnets carried therebetween, is arranged non-conducting material as wooden blocks or the like 33. This is, however, not essential and may be dispensed with if desired; also permanent magnets may be substituted for the electro magnets and various immaterial changes may be made without departing from the spirit of my invention, which is limited by the annexed claims only.

Having thus described my invention I claim as new and desire to secure by Letters Patent:

1. A magnetic separator comprising a drum having inner and outer magnetic surfaces adapted to serve independently in the separation of magnetic from non-magnetic particles, and means for detaching the magnetic particles from said surfaces.

2. A magnetic separator comprising a drum having an outer magnetic surface, an elevating drum surrounding the magnetic drum, and means for detaching adhering particles from said outer surface of the magnetic drum.

3. A magnetic separator comprising a drum having an outer magnetic surface, an elevating drum surrounding the magnetic drum, a hollow shaft having openings therein intermediate the two drums, means for detaching adhering particles from the outer surface of the magnetic drum, and discharging them through said openings, and a conveyer operable in said hollow shaft.

4. A magnetic separator, comprising a drum having inner and outer magnetic surfaces adapted to serve independently in the separation of magnetic from non-magnetic particles, an elevating drum surrounding the magnetic drum, and means for detaching the magnetic particles from both the inner and outer surfaces of the drum.

5. A magnetic separator, comprising a revoluble magnetic drum having inner and outer magnetic surfaces adapted to serve independently in the separation of magnetic from non-magnetic particles, a revoluble elevating drum surrounding the magnetic drum, and means for detaching the magnetic particles from both the inner and outer surfaces of the magnetic drum.

6. A magnetic separator, comprising a revoluble magnetic drum having inner and outer magnetic surfaces adapted to serve independently in the separation of magnetic from non-magnetic particles, a revoluble elevating drum eccentrically surrounding the magnetic drum, and means arranged in each drum for detaching the magnetic particles respectively from the inner and outer surfaces of the magnetic drum.

7. A magnetic separator, comprising a conical, magnetic drum having inner and outer magnetic surfaces adapted to serve independently in the separation of magnetic from non-magnetic particles, a conical elevating drum surrounding the magnetic drum, and means for detaching magnetic particles from the inner and outer surfaces of the magnetic drum.

8. A magnetic separator, comprising a conical, magnetic drum revolubly mounted having inner and outer magnetic surfaces adapted to serve independently in the separation of magnetic from non-magnetic particles, a conical, elevating drum revolubly mounted and eccentrically surrounding the magnetic drum, and means for detaching the magnetic particles from both the inner and outer surfaces of the magnetic drum.

9. A magnetic separator comprising a drum having a magnetic outer surface, a drum surrounding the magnetic drum having corrugations therein, providing ribs on its inner surface, and means arranged in the outer drum for detaching adhering particles from said magnetic surface.

10. A magnetic separator comprising a fixed hollow shaft having openings therein, a drum journaled on said shaft composed of an inner and outer shell, electro-magnets radially arranged interposed between said shells, means for detaching adhering particles from the inner shell and discharging them into the openings of said shaft, and means for detaching adhering particles from the outer shell.

11. A magnetic separator comprising a fixed hollow shaft having openings therein, a drum journaled on said shaft having means adapted to magnetize both its inner and outer surfaces, an elevating drum surrounding the magnetic drum, a second hollow shaft having openings therein fixed between said drums, means for detaching adhering particles from the inner surface of the magnetic drum and discharging them through the openings of the first-named shaft, and independent means for detaching adhering particles from the outer surface of the magnetic drum and discharging them through the openings of said second shaft.

12. A magnetic separator comprising a revoluble drum having a magnetic outer surface, a conical drum revolubly mounted and surrounding the magnetic drum, said conical drum having ribs on its inner surface, a hollow shaft fixed intermediate the two drums having openings therein, a conveyer operable in said hollow shaft, a trough carried by said shaft inclosing the openings therein, and means positioned above said trough for detaching adhering particles from the outer surface of the magnetic drum and discharging them in the said trough.

13. A magnetic separator, comprising a drum having inner and outer magnetic surfaces adapted to serve independently in the separation of magnetic from non-magnetic particles, means for detaching adhering particles from said surfaces, and means surrounding said drum operable to carry material to an elevated position and discharge it thereon.

14. A magnetic separator comprising a conical drum having an inner and outer magnetic surface, means for detaching adhering particles from said surfaces, and revoluble means operable to carry material to an elevated position and discharge it upon the outer surface of said magnetic drum.

15. A magnetic separator comprising a hollow shaft having openings therein, a conveyer operable in said shaft, a drum having an inner and outer magnetic surface revolubly mounted on said shaft, an elevating drum revolubly mounted and surrounding the magnetic drum, a second hollow shaft having openings therein fixed intermediate the two drums, a conveyer operable in said second shaft, and means for detaching adhering particles from the inner and outer surfaces of the magnetic drum and discharging them, respectively, through the openings of said first and second shafts.

16. A magnetic separator comprising a fixed hollow shaft having openings therein, a conical drum revolubly mounted on said shaft having inner and outer magnetic surfaces, a revoluble, conical, elevating drum eccentrically surrounding the magnetic drum, a second hollow shaft 1 having openings therein fixed between said drums; a conveyer operable in each of said shafts, a trough carried by each of said shafts and inclosing the openings therein, and means arranged above each trough for detaching adhering particles from the inner and outer surfaces of the magnetic drum.

17. A magnetic separator comprising a revoluble drum having an outer magnetic surface, an elevating drum surrounding the magnetic drum, means for detaching adhering particles from the outer surface of the magnetic drum, rollers for revolubly supporting the outer drum, and means for driving one of said rollers.

In testimony whereof I have signed my name to this specification in the presence of two subscribing witnesses.

JAMES BERNARD McCABE.

Witnesses:
CHARLES B. MOULTHROP,
WALTER B. WALSH.